United States Patent

Hung et al.

Patent Number: 5,363,462
Date of Patent: Nov. 8, 1994

[54] MULTILAYER WAVEGUIDE USING A NONLINEAR $LiN_bTA_{1-x}O_3$ OPTICAL FILM

[75] Inventors: Liang-Sun Hung, Webster; Jose M. Mir; John A. Agostinelli, both of Rochester, all of N.Y.

[73] Assignee: Eastman Kodak Company, Rochester, N.Y.

[21] Appl. No.: 85,361

[22] Filed: Jul. 2, 1993

[51] Int. Cl.$^5$ ............................ G02B 6/10; G02F 2/02
[52] U.S. Cl. ...................................... 385/122; 385/129; 385/130; 385/131; 385/141; 359/326; 359/332
[58] Field of Search .................... 385/5, 122, 129, 130, 385/131, 132, 141, 142, 144; 359/326, 328, 329, 330, 332

[56] References Cited

U.S. PATENT DOCUMENTS

| | | | |
|---|---|---|---|
| 5,013,129 | 5/1991 | Harada et al. | 385/122 X |
| 5,028,107 | 7/1991 | Bierlein et al. | 385/122 X |
| 5,113,469 | 5/1992 | Hatakoshi et al. | 385/122 |
| 5,158,823 | 10/1992 | Enomoto et al. | 385/122 |
| 5,168,388 | 12/1992 | Tamada et al. | 385/122 X |
| 5,170,460 | 12/1992 | Arvidsson et al. | 385/122 X |
| 5,249,191 | 9/1993 | Sawaki et al. | 385/122 X |
| 5,253,259 | 10/1993 | Yamamoto et al. | 385/122 X |
| 5,274,652 | 12/1993 | Senoh et al. | 385/122 X |
| 5,295,218 | 3/1994 | Agostinelli et al. | 385/122 |
| 5,303,247 | 4/1994 | Yamamoto et al. | 385/122 X |

OTHER PUBLICATIONS

"LiNbO3 thin-film optical waveguide grown by liquid phase eptaxy and its application to second-harmonic generation" by H. Tamada et al., J. Appl. Phys. 70 2536 (Sep. 1991).

Epitaxial Growth of LiNbO3–LiTaO3 Thin Films on Al2O3 by T. Kanata et al., J. Appl. Phys. 62, 2989 (Oct. 1987).

Primary Examiner—Brian Healy
Attorney, Agent, or Firm—Raymond L. Owens

[57] ABSTRACT

A multilayer waveguide having an optical film of $LiN_bTa_{1-x}O_3$ formed on the surface of a buffer layer or substrate of material having a nearly identical lattice structure and substantially low refractive index.

16 Claims, 6 Drawing Sheets

MULTILAYER WAVEGUIDE USING A NONLINEAR LIN$_b$TA$_{1-x}$O$_3$ OPTICAL FILM

FIELD OF THE INVENTION

The invention relates to a multilayer structure for nonlinear optical thin film waveguides.

BACKGROUND OF THE INVENTION

Nonlinear optics open up a wide range of applications for the generation of new frequencies and the control of light by light. The optical power required for nonlinear optical devices can be substantially reduced by using optical waveguides. The applications of guided wave nonlinear optics include second harmonic generation, parametric devices, modulators, and nonlinear switching. The process involves the mixing of one or more optical beams over some interaaction length. The interaction efficiency is governed by the nonlinear optical response of the medium, the intensity of the interacting beams, and the distance over which phase matched mixing occurs. The first factor is a materials issue. The other two factors are optimized by guided wave geometries. Optical waveguides consist of regions of high refractive index bounded by regions of low index, thus providing strong beam confinement over long propagation distances. The size of the confinement regions is the order of the wavelength of light and strong depends on the difference in refractive index between the nonlinear opticl film and the bounding media. The distance over which the mixing occurs is limited by the propagation lobbed, that are closely related to crystal imperfection and interface structures, and by the waveguide nonuniformity.

LiNbO$_3$ is an attractive material for applications of nonlinear optics because of its large nonlinear susceptibilities, transparency from 350 to 4000 nm, and well developed waveguide technologies. Several methods are known to form a thin film optical waveguide using LiNbO$_3$. Ti-doped LiNbO$_3$ films on LiNbO$_3$ substrates or LiNbO$_3$ films on Mg-doped LiNbO$_3$substrates have been used to form structures with different refractive indices. Although a good epitaxial structure can be achieved in this case due to nearly equal lattice constants of pure and doped-LiNbO$_3$, the differences in refractive index between the surface layer and underlaying substrate are quite small. For instance, the refractive index of 5-mol% MgO-doped and undoped LiNbO$_3$ at 630 nm is 2.192 and 2.203, respectively. See "LiNbO$_3$ thin-film optical waveguide grown by liquid phase epitaxy and its application to second-harmonic generation", by H. Tamada et al., J. Appl. Phys. 70, 2536 (1991). Thus a thick surface layer is required to form a waveguide, and the optical confinement is relatively poor, resulting in low guided-wave intensities and limited efficiencies of nonlinear optical interactions. Recently c-oriented epitaxial films of LiNbO$_3$ and LiTaO$_3$ have been grown on sapphire. See "Epitaxial Growth of LiNbO$_3$-LiTaO$_3$ Thin Films on Al$_2$O$_3$" by T. Kanata et al., J. Appl. Phys. 62, 2989 (1987). In such cases a significant improvement in optical confinement can be achieved, because the Al$_2$O$_3$ refractive index 1.76 is substantially lower than those of LiNbO$_3$ or LiTaO$_3$. However, the large lattice mismatch of 7.6% for LiNbO$_3$ or LiTaO$_3$ grown on Al$_2$O$_3$ results in relatively poor crystallines and surface morphologies, as compared to the first approach. U.S. Pat. No. 5,158,823 issued Oct. 27, 1992 to Enomoto et al achieved a second harmonic wave generating device using sequential deposition of LiTaO$_3$ and LiNbO$_3$ on LiNbO$_3$ single crystals to form a structure of LiNbO$_3$/LiTaO$_3$/LiNbO$_3$. Lattice matching is achievable because of the similar crystal structure of LiNbO$_3$ and LiTaO$_3$, and the difference in refractive index is approximately 0.1, substantially greater than that obtained by the first approach. However, the difference in refractive index is not sufficiently high to achieve the very tight optical confinement. Moreover, the concept is not applicable to the use of LiTaO$_3$ for nonlinear optical devices, because the reversal of the deposition sequence with LiTaO$_3$ on LiNbO$_3$ forms a non-waveguide structure.

SUMMARY OF THE INVENTION

It is an object of this invention to provide an optical waveguide structure having good lattice matching and pronounced differences in refractive index.

This object is achieved in a waveguide structure comprising a single crystal substrate of LiNb$_x$Ta$_{1-x}$O$_3$, an epitaxial buffer layer overlaying the substrate, and a nonlinear optical film of LiNb$_x$Ta$_{1-x}$O$_3$ grown epitaxially on the buffer layer, the buffer layer having a substantially low refractive index and a nearly identical lattice structure with respect to the LiNb$_x$Ta$_{1-x}$O$_3$ optical film so that the difference in refractive index between the buffer layer and LiNb$_x$Ta$_{1-x}$O$_3$ optical film is larger than 0:1; and the buffer layer being selected to structurally match the LiNb$_x$Ta$_{1-x}$O$_3$ with a mismatch equal to or less than 7%.

This object is also achieved in a waveguide structure comprising a single crystal substrate and a nonlinear optical film LiNb$_x$Ta$_{1-x}$O$_3$ (x=0 to 1) grown epitaxially on the substrate, the substrate having a substantially low refractive index and a nearly identical lattice structure with respect to the LiNb$_x$Ta$_{1-x}$O$_3$ optical film so that the difference in refractive index between the substrate and LiNb$_x$Ta$_{1-x}$O$_3$optical film is larger than 0.1; and the substrate being selected to structurally match the LiNb$_x$Ta$_{1-x}$O$_3$with a mismatch equal to or less than 7%.

It is an advantage of this invention that optical waveguides have both good lattice matching and pronounced differences in refractive indices which help to achieve very tight optical confinement.

DETAILED DESCRIPTION OF THE PREFERRED EMBODIMENTS

Figure 1:
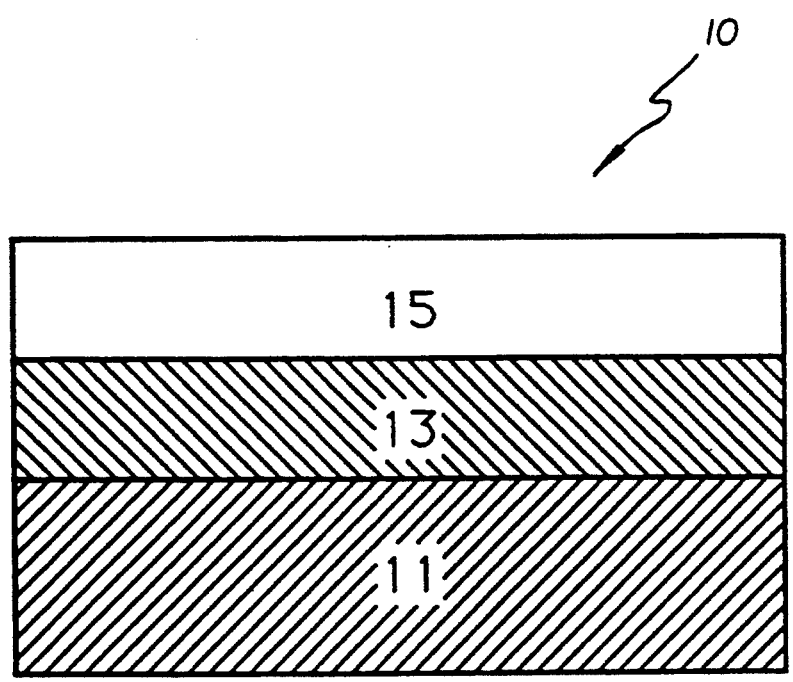
FIG. 1 is a schematic diagram of an embodiment of the multilayer structure of the invention.

Referring to FIG. 1 a multilayer waveguide 10 in accordance with this invention is shown. The waveguide 10 includes a c-oriented single crystal of LiNb$_x$-

Figure 2:
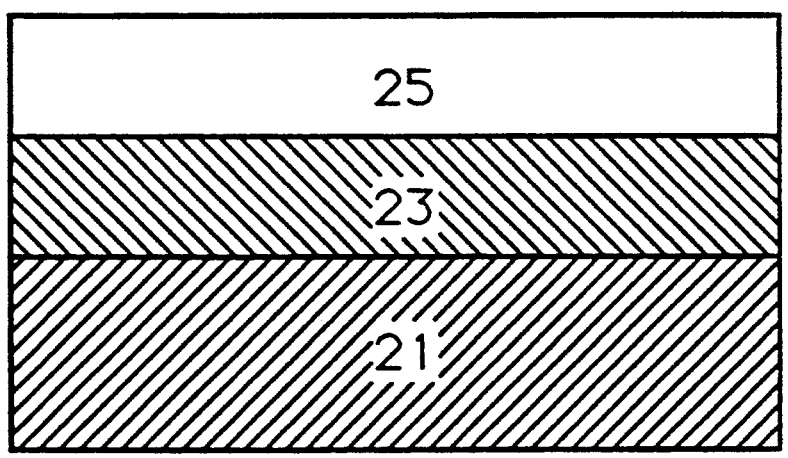
FIG. 2 is a schematic diagram of a specific embodiment of the multilayer structure of the invention.
Figure 3:
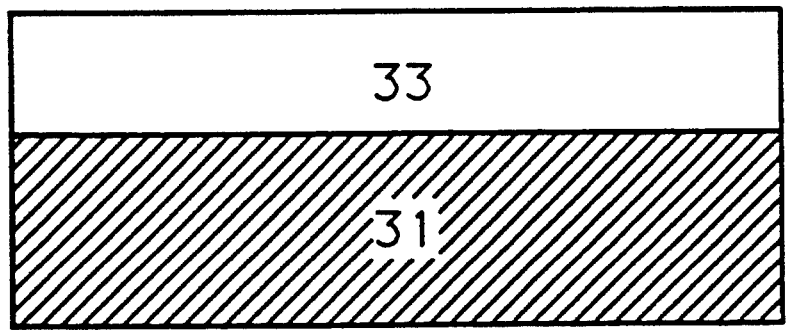
FIG. 3 is a schematic diagram of an alternative embodiment of the invention.

$Ta_{1-x}O_3$ substrate 11, an epitaxial overlaying buffer layer 13, and a nonlinear optical film of $LiNb_xTa_{1-x}O_3$ 15. A specific embodiment of the multilayer structure is shown in FIG. 2. A waveguide 20 consists of a c-oriented single crystal substrate of $LiNb_xTa_{1-x}O_3$ 21, an epitaxial buffer layer 23 of c-oriented $Mg_4(Nb_xTa_{1-x})_2O_9$ or (111)-oriented MgO, and a c-oriented $LiNb_xTa_{1-x}O_3$ film 25 grown epitaxially on the buffer layer. A two layer embodiment of the invention is shown in FIG. 3. The waveguide 30 includes a c-oriented single crystal of $Mg_4(Nb_xTa_{1-x})_2O_9$ 31 and a c-oriented $LiNb_xTa_{1-x}O_3$ film 33.

The substrates are c-oriented single crystals. This is a preferable orientation, because it allows easy use of $d_{33}$ and $\gamma_{33}$, the largest nonlinear optical and electro-optical coefficient for $LiNb_xTa_{1-x}O_3$. However, the same concept can be applied to "x cut" and "y cut" substrates for some applications. The materials used to fabricate the heteroepitaxial layers can be doped, lightly doped or heavily doped, as long as the doping does not significantly alter their crystallinities and optical transparency.

The buffer layer 13 in FIG. 1 is (1) transparent over a wide range of wavelengths, (2) an optical film with a substantially lower refractive index than the nonlinear optical film, and (3) a single crystal film having the same rotation symmetry as that of the substrate 11 about the surface normal and the lattice constants nearly equal to those of the substrate 11. We have found that the oxides $Mg_4(Nb_xTa_{1-x})_2O_9$ (x=0 to 1) and MgO provide excellent buffer layer properties and are most suitable to form waveguides with $LiNbO_3$ and $LiTaO_3$. The characteristics of those materials are listed in Table 1. Both $Mg_4Nb_2O_9$ and $Mg_4Ta_2O_9$ have the same structure as $LiTaO_3$, and the lattice mismatch of $Mg_4Nb_2O_9$ and $Mg_4Ta_2O_9$ to $LiTaO_3$ is 0.18% and 0.16% respectively. The difference in refractive index between $Mg_4(Nb_xTa_{1-x})_2O_9$ (x=0 to 1) and $LiNb_xTa_{1-x}O_3$ is significantly larger than that between $LiNbO_3$ and $LiTaO_3$. As indicated for MgO in Table 2, although differences exist in crystal structures between MgO and $LiTaO_3$, they have the same oxygen ion framework in their (111) and (0001) planes with a mismatch less than 0.2%. For purposes of this disclosure, they will be considered to have similar structures. The difference in refractive index between MgO and $LiTaO_3$ is 0.443.

The buffer layer can be grown epitaxially by many conventional manners, such as laser ablation, sputtering, or chemical vapor deposition. It is necessary that the buffer attains a sufficient thickness, so that the strength of the evanescent tail of the mode propagating in the nonlinear optical film is negligible at the substrate-buffer layer interface to prevent guided wave loss. A sufficient thickness ranges from 200 to 3000 nm, preferably 400 to 1000 nm.

The overlaying nonlinear optical film of $LiNb_xTa_{1-x}O_3$ can be grown by any conventional methods, such as rf-sputtering, laser ablation or metal organic chemical vapor deposition. A sufficient thickness ranges from 100 to 3000 nm, preferably 400 to 1000 nm.

EXAMPLES

Polycrystalline $Mg_4Nb_2O_9$ or $Mg_4Ta_2O_9$ targets were prepared using calcined reagent-grade MgO and $Nb_2O_5$ or $Ta_2O_5$. Samples were pelletized under a pressure of 5000 psi, and sintered in air in a platinum crucible at temperatures of 1400° C. and 1500° C. for $Mg_4Nb_2O_9$ and $Mg_4Ta_2O_9$, respectively. C-oriented $LiNbO_3$ wafers were used as substrates for epitaxial growth of MgO, $Mg_4Nb_2O_9$ or $Mg_4Ta_2O_9$ films. After a conventional cleaning in toluene, 2-propanol, and deionized water, the wafers were annealed in air at 700° C. for 1 hour prior to being loaded in a chamber for deposition.

MgO was then deposited on $LiNbO_3$ by electron-beam evaporation. The deposition process was carried out at $3 \times 10^{-8}$ Torr without introducing additional oxygen into the system. The substrate was heated by a radiative heater consisting of tantalum wires. The deposition was carried out at 400° C.–550° C. and at 0.05–0.15 nm/s with a total thickness of 300–500 nm.

$Mg_4Nb_2O_9$ or $Mg_4Ta_2O_9$ films were grown by pulsed laser ablation. A laser pulse energy of 300–360 mJ with a 30 ns duration and a pulse rate of 4Hz was generated by a KrF excimer laser. The beam was focused to a 5 $mm^2$ spot onto a target of polycrystalline $Mg_4Nb_2O_9$ or $Mg_4Ta_2O_9$. The $LiNbO_3$ substrate was located 6 cm from the target and heated to 650° C.–750° C. by a

TABLE 1

Crystal Structures and Refractive Indices of $LiNb_xTa_{1-x}O_3$, $Al_2O_3$, and $Mg_4(Nb_xTa_{1-x})_2O_9$

| Structure | $LiTaO_3$ trigonal | $Al_2O_3$ trigonal | $LiNbO_3$ trigonal | $Mg_4Nb_2O_9$ trigonal | $Mg_4Ta_2O_9$ trigonal |
|---|---|---|---|---|---|
| a(nm) | 0.51530 | 0.47630 | 0.51494 | 0.51624 | 0.51611 |
| Mismatch to $LiTaO_3$ (%) | 0.00 | −7.57 | −0.07 | 0.18 | 0.16 |
| c(nm) | 1.3755 | 1.3003 | 1.3862 | 1.40240 | 1.40435 |
| Mismatch to $LiTaO_3$ (%) | 0.00 | −5.47 | 0.78 | 1.96 | 2.10 |
| n(refractive index at 633 nm) | 2.180($n_e$) 2.175($n_o$) | 1.760 | 2.20($n_e$) 2.28($n_o$) | 1.95 at 546.1 nm | 1.85 |
| n-n($LiTaO_3$) | 0.00 | −0.42 | 0.020($n_e$) 0.105($n_o$) | −0.23 | −0.33 |

TABLE 2

Crystal Structures and Refractive Indices of $LiNb_xTa_{1-x}O_3$ and MgO

| | $LiTaO_3$ | $LiNbO_3$ | MgO |
|---|---|---|---|
| Symmetry of oxygen sublattice | 6-fold | 6-fold | 6-fold |
| Distance between neighboring oxygen atoms | 2.974 | 2.972 | 2.978 |
| Mismatch to $LiTaO_3$ (%) | 0.00 | −0.07 | 0.13 |
| n(refractive index) at 633 nm | 2.180($n_e$) 2.175($n_o$) | 2.20($n_e$) 2.28($n_o$) | 1.737 |
| n-n($LiTaO_3$) | 0.00 | 0.020($n_e$) 0.105($n_o$) | −0.443 | resistive heater. The temperature was monitored by a thermocouple attached to an inner wall of the heater block. The deposition was carried out at a rate of 0.1 nm/pulse under an oxygen pressure of 100 m Torr. After 4000–6000 pulses the oxygen pressure was raised to 150 Torr, and the sample was cooled to room temperature.

$LiNbO_3$ and $LiTaO_3$ films were deposited by pulsed laser deposition on $LiNbO_3$ with an intermediate buffer layer of MgO, $Mg_4Nb_2O_9$ or $Mg_4Ta_2O_9$. The deposition conditions are similar to those for $Mg_4Nb_2O_9$ or $Mg_4Ta_2O_9$, except that a relatively low deposition temperature of 600°–650° C. was used.

The samples were characterized by x-ray diffraction. The distribution of c-axis orientations relative to the normal of the substrate surface was determined by x-ray rocking curve analysis, and the feature of in-plane orientation was examined by x-ray pole figure analysis. These techniques are well known and are illustrated by B. D. Cullity, Elements of x-ray Diffraction (Addison-Wesley, Reading, MA).

EXAMPLE 1

A thin film of MgO with a thickness of 400 nm was deposited on a c-oriented $LiNbO_3$ substrate at 550° C. by e-beam evaporation, and a layer of $LiTaO_3$ with a thickness of 500 nm was then deposited on the MgO coated $LiNbO_3$ substrate at 650° C. by laser ablation.

The standard 2-theta diffraction pattern taken from a MgO film on $LiNbO_3$ revealed only the MgO(111) and $LiNbO_3$(006) diffraction peaks. The full width at half maximum (FWHM) of the MgO(111) rocking curve measured about 0.5°. Epitaxial growth of MgO on $LiNbO_3$ was verified by x-ray pol figure analysis. The pole figure taken from the (200) peak of the MgO overlayer exhibits three spot-like pole densities showing three-dimensional alignment. A comparison of the results obtained from MgO and that from the underlaying $LiNbO_3$ indicates that a single-crystal (111)-oriented MgO film was grown on c-oriented $LiNbO_3$ with an in-plane alignment of MgO(110) parallel to $LiNbO_3$(110).

Figure 4:
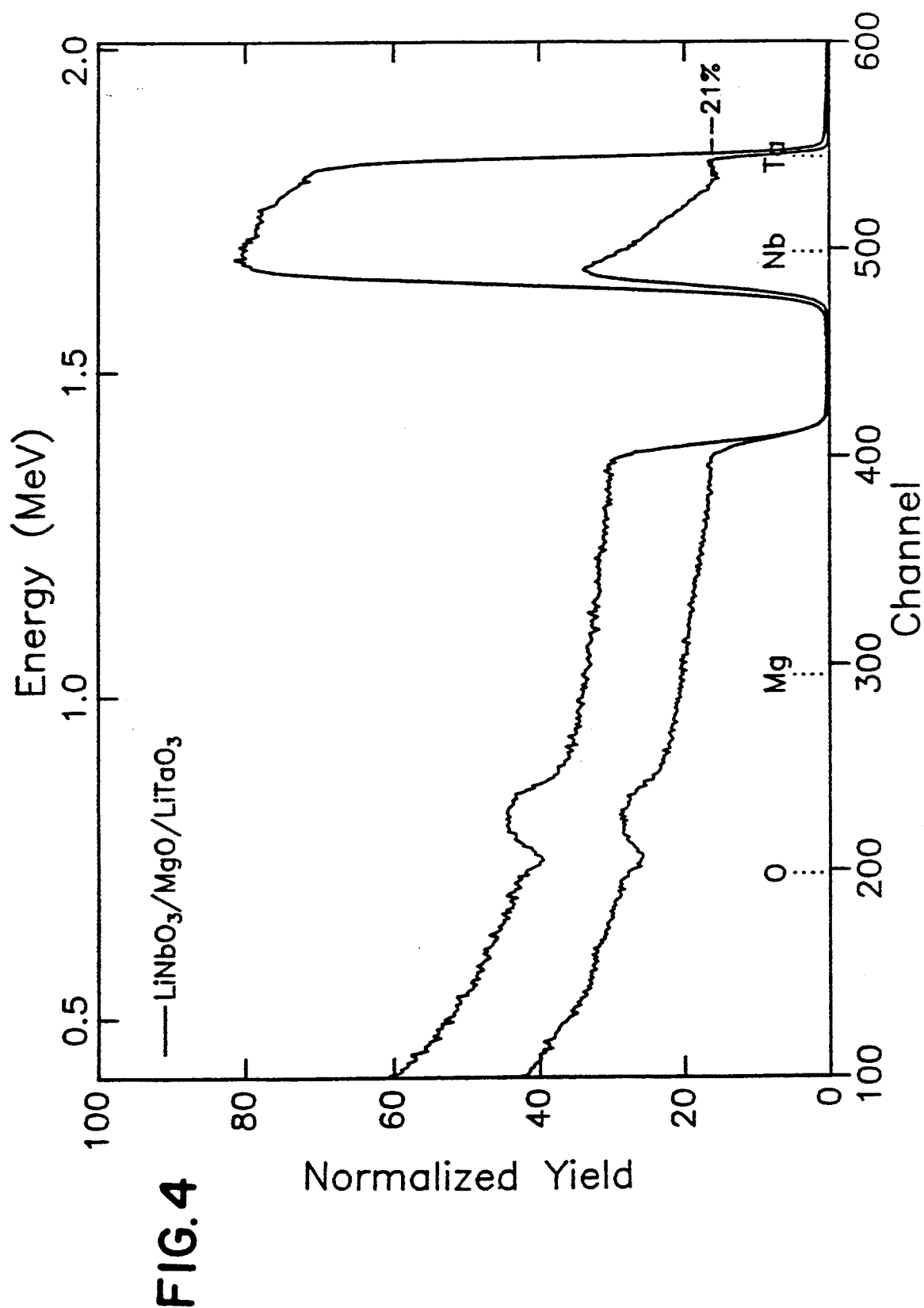
FIG. 4 shows ion channeling spectra of a heteroepitaxial structure of c-oriented LiNbO$_3$/MgO/LiTaO$_3$.

$LiTaO_3$ films prepared on (0001)$LiNbO_3$/MgO were shiny and smooth. The good crystal quality of the $LiTaO_3$ film was verified by ion channeling measurements. FIG. 4 shows backscattering spectra with He ions at both a random and a (0001)-oriented incidence. The minimum yield of the $LiTaO_3$ film was determined to be about 0.2. The crystallinity can be further improved by optimizing the experimental conditions for MgO deposition. The (001) $LiNbO_3$/MgO/$LiTaO_3$ was optically characterized by the m-line spectroscopic measurements and guided optical waves were found in the $LiTaO_3$ film.

EXAMPLE 2

A thin film of MgO with a thickness of 400 nm was deposited on a c-oriented $LiNbO_3$ substrate at room temperature, and then annealed at 705° C. for 60 min in $O_2$. X-ray analysis reveals that besides the peaks from MgO(111) and $LiNbO_3$(0006), several lines appear in the diffraction pattern, corresponding to a phase of $Mg_4Nb_2O_9$. The full width at half maximum of the MgO(111) and $Mg_4Nb_2O_9$ (004) rocking curves measured about 1.4° and 0.5°, respectively. These results indicate that $Mg_4Nb_2O_9$ is readily grown on $LiNbO_3$ and $LiTaO_3$ to form an epitaxial film. The structure information from JCPDS-ICDD 38-1458 and 38-1459 further supports our data. See for example Powder Diffraction File (International Centre for Diffraction Data, USA, 1992). Thus, the following experiments were carried out to form the heteroepitaxial structures $LiNbO_3$/$Mg_4Nb_2O_9$/$LiTaO_3$ and $LiNbO_3$/$Mg_4Ta_2O_9$/$LiTaO_3$. Our refractive index measurements on $Mg_4Nb_2O_9$ and $Mg_4Ta_2O_9$ indicate that both materials can be used as bounding media to form optical waveguides with $LiNbO_3$ or $LiTaO_3$.

EXAMPLE 3

Figure 5:
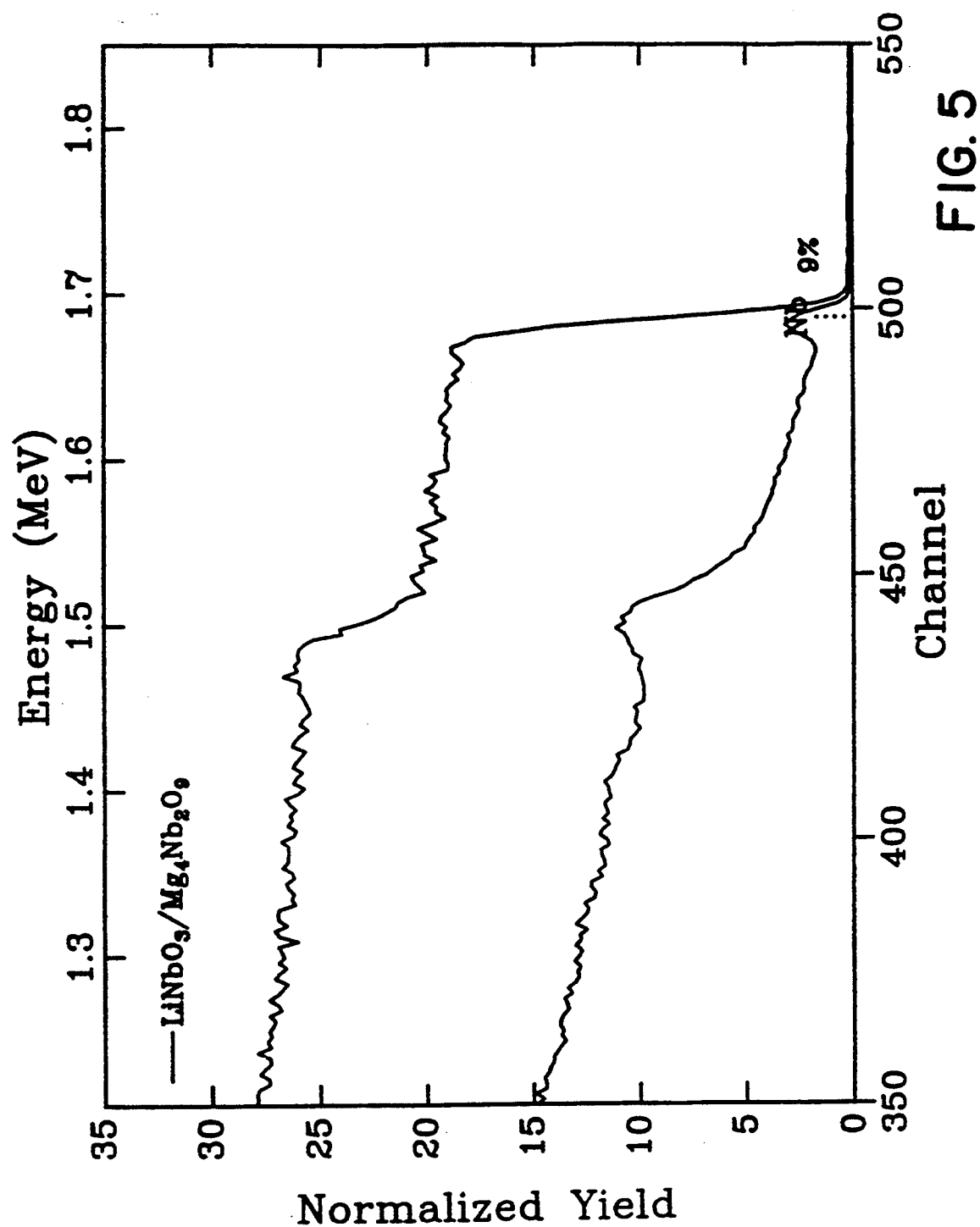
FIG. 5 shows ion channeling spectra of Mg$_4$Nb$_2$O$_9$ on c-oriented LiNbO$_3$.

A thin film of $Mg_4Nb_2O_9$ with a thickness of 500 nm was deposited on a c-oriented $LiNbO_3$ substrate at 750° C. by laser ablation. The standard 2-theta diffraction pattern taken from a $Mg_4Nb_2O_9$ film on $LiNbO_3$ reveals only the (0002), (0004) and (0006) diffraction peaks from $Mg_4Nb_2O_9$ and the (0006) peak from $LiNbO_3$. Ion channeling spectra in FIG. 5 show a highly oriented $Mg_4Nb_2O_9$ film on $LiNbO_3$ with a minimum channeling yield of 9%. Since no data are available on refractive indices of $Mg_4Nb_2O_9$, ellipsometric measurements were carried out on a $Mg_4Nb_2O_9$ film grown on $LiNbO_3$. The refractive index of $Mg_4Nb_2O_9$ at 546.1 nm was determined to be about 1.95. Since $Mg_4Nb_2O_9$ is transparent and has a lower refractive index than of $LiTaO_3$, a thin-film waveguide is formed in the structure of $LiNbO_3$ /$Mg_4Nb_2O_9$ /$LiTaO_3$. The minimum channeling yield of the $LiTaO_3$ film was determined to be 12%.

EXAMPLE 4

A thin film of $Mg_4Ta_2O_9$ with a thickness of 500 nm was deposited on a c-oriented $LiTaO_3$ substrate at 750° C., and then a thin film of $LiTaO_3$ with a thickness of 500 nm was grown on the $Mg_4Ta_2O_9$ coated $LiNbO_3$ substrate. The standard 2-theta diffraction pattern taken from a $Mg_4Nb_2O_9$ film on $LiNbO_3$ reveals only the (0002), (0004) and (0006) diffraction peaks from $Mg_4Ta_2O_9$ and the (0006) peak from $LiNbO_3$. Ellipsometric measurements were carried out on a $Mg_4Ta_2O_9$ film grown on $LiNbO_3$, and a refractive index of 1.85 at 633 nm was determined. The difference in refractive index between $LiTaO_3$ and $Mg_4Ta_2O_9$ is approximately 0.3 or three times higher than that between $LiTaO_3$ and $LiNbO_3$, so that 500 nm of $LiTaO_3$ on 500 nm of $Mg_4Ta_2O_9$ is sufficient to form a waveguide with an optical loss less than 0.2dB/cm.

Figure 6:
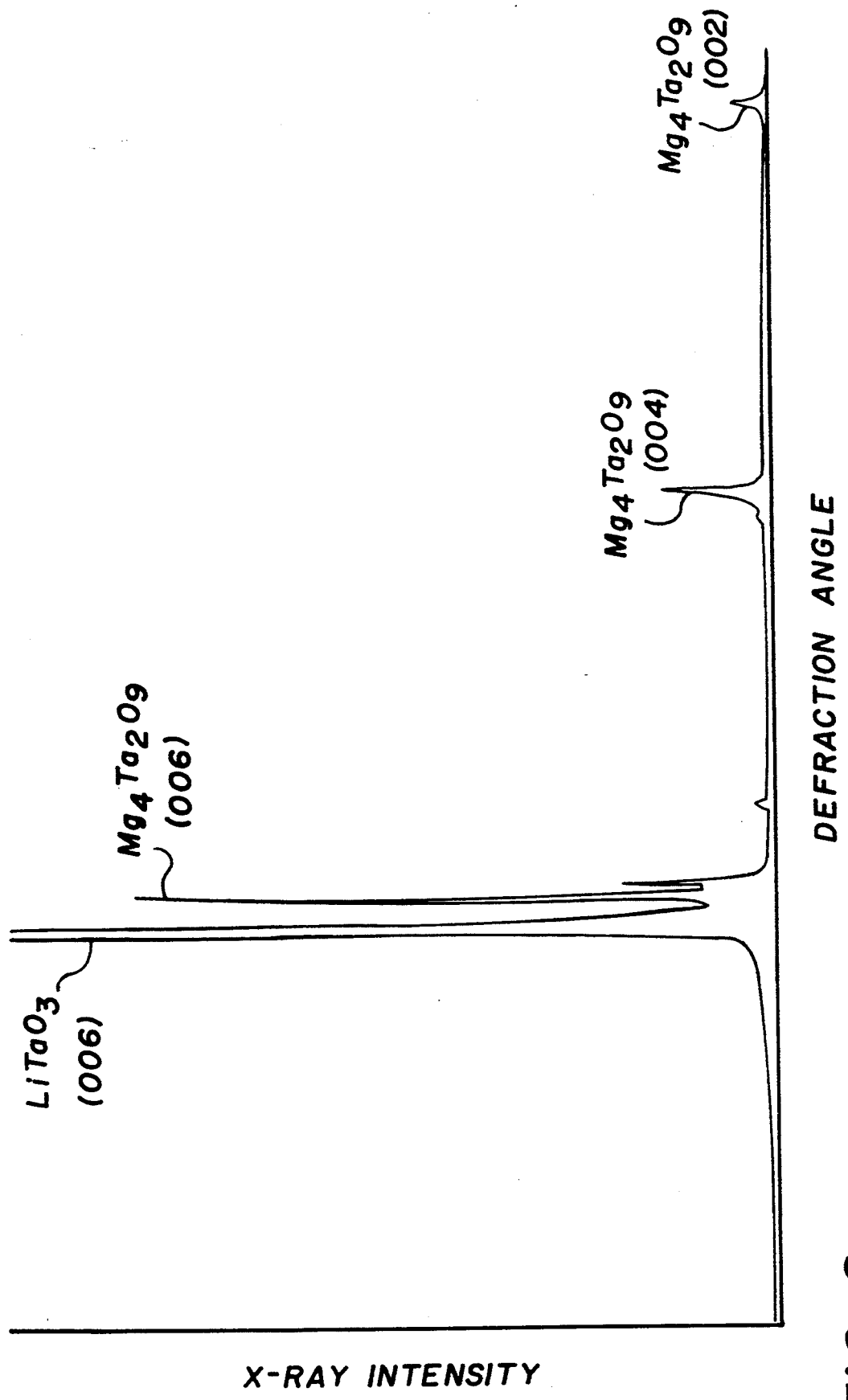
FIG. 6 is a x-ray diffraction pattern of a heteroepitaxial structure of c-oriented LiNbO$_3$ /Mg$_4$Ta$_2$O$_9$/LiTaO$_3$.

The standard 2-theta diffraction pattern in FIG. 6 taken from a heteroepitaxial structure of $LiNbO_3$ /$Mg_4Ta_2O_9$ /$LiTaO_3$ exhibits approximately the same profile as that observed for $LiNbO_3$ /$Mg_4Ta_2O_9$. The $LiTaO_3$ and $LiNbO_3$ reflection lines overlap because of their identical crystal structure and almost equal lattice parameter. The minimum channeling yield of $LiTaO_3$ film was determined to be 7.8%, indicating a high degree of epitaxy.

The invention has been described in detail with particular reference to certain preferred embodiments thereof, but it will be understood that variations and modifications can be effected within the spirit and scope of the invention.

PARTS LIST

10: Waveguide
11: Substrate
13: Buffer Layer
15: Film
20: Waveguide
21: Substrate
23: Buffer Layer 25: Film
30: Waveguide
31: Crystal
33: Film

I claim:

1. A multilayer waveguide comprising:
a c-oriented single crystal substrate of $LiNb_xTa_{1-x}O_3$ (x=0 to 1);
an epitaxial buffer layer having a thickness of from 200 to 1000 nm overlaying the substrate, and a nonlinear optical thin film $LiNb_xTa_{1-x}O_3$ having a thickness of 200 to 1000 nm grown epitaxially on the buffer layer;
the buffer layer providing a substantially low refractive index and having a nearly identical lattice structure with respect to the $LiNb_xTa_{1-x}O_3$ substrate so that the difference in refractive index between the buffer layer and $LiNb_xTa_{1-x}O_3$ is larger than 0.1; and
the buffer layer being selected to structurally match the $LiNb_xTa_{1-x}O_3$ substrate with a mismatch equal to or less than 7%.

2. A waveguide structure comprising:
a single crystal substrate and a nonlinear optical film $LiNb_xTa_{1-x}O_3$(x=0 to 1) grown epitaxially on the substrate;
the substrate having a substantially low refractive index and a nearly identical lattice structure with respect to the $LiNb_xTa_{1-x}O_3$ optical film so that the difference in refractive index between the substrate and $LiNb_xTa_{1-x}O_3$ optical film is larger than 0.1; and
the substrate being selected to structurally match the $LiNb_xTa_{1-x}O_3$ with a mismatch equal to or less than 7%.

3. A structure according to claim 1 wherein said buffer layer is MgO.

4. A structure according to claim 1 wherein said buffer layer is $Mg_4(Nb_xTa_{1-x})_2O_9$ (x=0 to 1).

5. A structure according to claim 2 wherein said substrate is $Mg_4(Nb_xTa_{1-x})_2O_9$(x=0 to 1).

6. A multilayer waveguide comprising:
(a) a c-oriented single crystal substrate of $LiNb_xTa_{1-x}O_3$;
(b) an epitaxial buffer layer of c-oriented $Mg_4(Nb_4Ta_{1-x})_2$ or (111)-oriented MgO having a thickness of 200 to 1000 nm;
(c) a c-oriented single crystal optical film of $LiNb_xTa_{1-x}O_3$ (x=0 to 1) and having a thickness of 200 to 1000 nm; and
(d) the buffer layer providing a substantially low refractive index and having a nearly identical lattice structure with respect to the $LiNb_xTa_{1-x}O_3$ so that the difference in refractive index between the buffer layer and $LiNb_xTa_{1-x}O_3$ is larger than 0.1, and the mismatch of the buffer to $LiNb_xTa_{1-x}O_3$ is equal to or less than 7%.

7. A waveguide structure according to claim 3 comprising a single crystal substrate of $LiNbO_3$ and a nonlinear optical film of $LiNbO_3$ epitaxially grown on the buffer layer.

8. A waveguide structure according to claim 3 comprising a single crystal substrate of $LiNbO_3$ and a nonlinear optical film of $LiTaO_3$ epitaxially grown on the buffer layer.

9. A waveguide structure according to claim 4 comprising a single crystal structure of $LiNbO_3$, an epitaxial buffer layer of $Mg_4Nb_2O_9$ overlaying the substrate, and a nonlinear optical film of $LiNbO_3$ epitaxially grown on the buffer layer.

10. A waveguide structure according to claim 4 comprising a single crystal substrate of $LiNbO_3$, an epitaxial buffer layer of $Mg_4Nb_2O_9$ overlaying the substrate, and nonlinear optical film of $LiTaO_3$ epitaxially grown on the buffer layer.

11. A waveguide structure according to claim 4 comprising a single crystal of $LiNbO_3$, an epitaxial buffer layer of $Mg_4Ta_2O_9$ overlaying the substrate, and a nonlinear optical film of $LiNbO_3$ epitaxially grown on the buffer layer.

12. A waveguide structure according to claim 4 comprising a single crystal substrate of $LiNbO_3$, an epitaxial buffer layer of $Mg_4Ta_2O_9$ overlaying the substrate, and a nonlinear optical film of $LiTaO_3$ epitaxially grown on the buffer layer.

13. A waveguide structure according to claim 5 comprising a single crystal substrate of $Mg_4Nb_2O_9$ and a nonlinear optical film of $LiNbO_3$ epitaxially grown on the substrate.

14. A waveguide structure according to claim 5 comprising a single crystal substrate of $Mg_4Nb_2O_9$ and a nonlinear optical film of $LiTaO_3$ epitaxially grown on the substrate.

15. A waveguide structure according to claim 5 comprising a single crystal substrate of $Mg_4Ta_2O_9$ and a nonlinear optical film of $LiNbO_3$ epitaxially grown on the substrate.

16. A waveguide structure according to claim 5 comprising a single crystal substrate of $Mg_4Ta_2O_9$ and a nonlinear optical film of $LiTaO_3$ epitaxially grown on the substrate.

* * * * *